April 7, 1953  E. J. HOBSON ET AL  2,633,758
METHOD OF MANUFACTURING INLAY KNOBS AND THE LIKE
Filed March 1, 1950
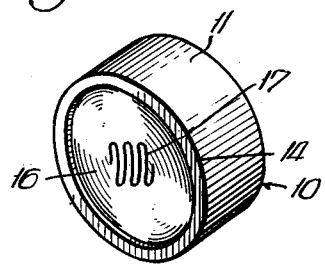
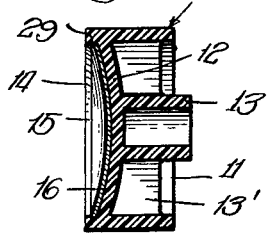
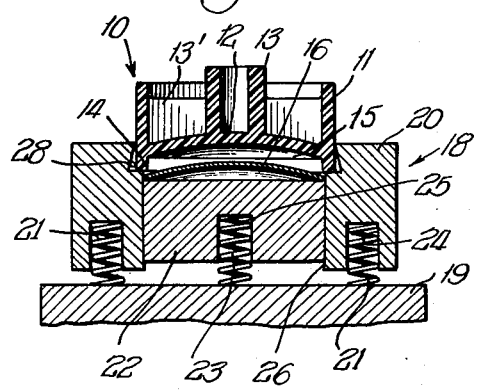
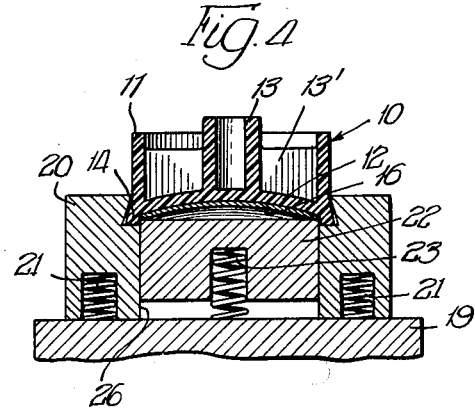
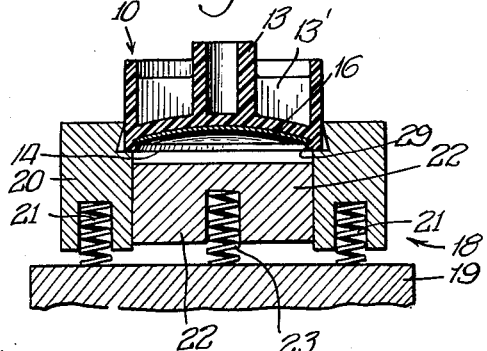
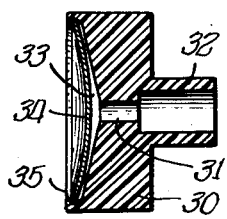
INVENTORS
Erwin J. Hobson,
BY Carl J. Lind,
Cromwell, Greist & Warden
ATTYS Patented Apr. 7, 1953

2,633,758

UNITED STATES PATENT OFFICE 2,633,758

METHOD OF MANUFACTURING INLAY KNOBS AND THE LIKE

Ervin J. Hobson, Chicago, and Carl J. Lind, Skokie, Ill., assignors to Rohden Manufacturing Co., Chicago, Ill., a partnership consisting of P. M. Rohden and L. M. Rohden Application March 1, 1950, Serial No. 147,086

5 Claims. (Cl. 74—553)

The present invention relates to an improvement in ornamental inlaid plastic knobs, control buttons and the like, such as are commonly applied to radio, phonograph and television control panels, as well as other types of furniture, cabinet-work or equipment, and especially to an improved method for manufacturing the same.

It is a general object of the invention to provide a very simple, reliable and inexpensive method of manufacturing knobs and related elements of the sort referred to above, all characterized by a molded plastic knob body and by an ornamental disk disposed across an exposed forward face of said body in recessed or inlaid relation thereto, which method involves merely a simple operation of applying pressure to the plastic body in order to mount the ornamental disk in inlaid, displacement resisting relation thereto, without requiring either the use of a separate disk retaining ring to hold the disk in place or special preliminary or final treatment of the knob body in order to condition the same to receive or to retain the inlay disk.

A more specific object of the invention is to provide an improved method for assembling an ornamental inlay disk to a control or related type of knob, fabricated of any one of a number of well known, normally relatively rigid, but inherently elastic, plastic compositions, said knob having a forwardly facing disk recess, in which an inlay disk is disposed in securely gripped, inlaid position in said recess by a single application of thrust to the knob serving to spread the wall of the recess, thereby to enable the disk to be positioned properly in the recess in withdrawn relation to the forward mouth of the latter and to be embeddingly engaged by the knob about the periphery thereof upon cessation of the application of pressure, this being accomplished by a cold flowing action which is inherent in the material of the knob.

Still more specifically, it is an object of the invention to provide a method of manufacturing a two-part control knob, characterized by a plastic body and a thin ornamental disk inlaid in a forwardly opening recess of said body, in which said recess is shaped in a diameter somewhat less than that of the disk, the recess is aligned with the disk, and the rim of the recess is forced against a coaxial end abutment so as to cause the material of the body to spread outwardly, the disk then being inserted within the spread recess and the material surrounding the recess being allowed to return by cold flow to its original position, in which it assumes overlapped locking engagement with the margin of the disk.

Generally, it is an object of the invention to provide an improved ornamental inlaid disk type of knob or the like, and an improved method of manufacturing the same which is performed quickly, inexpensively and with uniformly successful results by simple means and by inexperienced personnel, without requiring either special pre-treating, i. e., heating or other type of plasticization of the knob body in order to adapt it for reception of the ornamental inlay disk or special after-treatment to retain the disk, which avoids any marring or unsightly disfiguration at the line of juncture between the knob and disk, which neatly embeds the edge of the disk, and in which the need for special means to hold the disk in place is dispensed with, resulting in a two-part product which is very attractive in appearance notwithstanding its low cost of production.

The foregoing statements are indicative in a general way of the nature of the invention, but other and more specific objects will be apparent to those skilled in the art upon a full understanding of the construction and operation of the device.

A single embodiment of the method is presented herein for purpose of illustration, but it will be appreciated that the same is susceptible of modification or other adaptation than that shown, but coming equally within the scope of the appended claims.

In the drawings:

Fig. 1 is a perspective view illustrating an ornamental inlaid control knob, button or like element as produced in accordance with the method of the present invention;

Fig. 2 is a view in vertical section through the axis of the knob of Fig. 1, illustrating the improved embedded, rim gripping relationship of the material of the knob body to the ornamental face disk inlaid therein by the method;

Figs. 3, 4 and 5 are similar, generally schematic views in vertical axial section through an apparatus suitable for performing the method of the invention, showing successive operations involved in the improved procedure of applying the ornamental inlay disk to the knob body; and Fig. 6 is a view in axial section through a slightly different type of inlaid member, to the production of which the present method is equally well adapted.

Referring to Figs. 1 and 2 of the drawing, a known type of ornamental control knob or button, illustrative of those to the production of which the invention relates, is generally designated by the reference numeral 10. The component parts thereof, as they appear prior to assembly, are shown in Fig. 3. This knob is fabricated of one of a number of well known plastic compositions, i. e., a cellulose acetate such as "Tenite" or "Lumarith," a polystyrene, ethyl cellulose, etc., adapted to be molded in relatively rigid form, yet nevertheless having sufficient resilience to enable elastic yielding under the application of force. Knob 10 includes a hollow cylindrical outer shell or body 11 having a circular forwardly concave front wall 12, an integral, tubular stem extension 13 which projects rearwardly of the wall 12 and is adapted for a frictional fit on a shaft, fixed pin or other member to be controlled by the knob, and an internal spider construction or ribbing 13' integrally connecting the stem to the shell for increased strength. External knurling may be provided on the body or shell 11, or it may be other than circular in external outline, or may be fluted or otherwise specially shaped, as desired. The invention deals with the method of inlaying such a body and is not particularly concerned with the outer configuration of the knob.

An integral, annular rib, flange or peripheral wall 14 projects forwardly of the outer face of wall 12 to define a forwardly opening circular recess 15. Recess 15 receives an ornamental inlay disk 16, the wall 14 being in inwardly overlapping embedding and gripping relation to the margin of said disk, as illustrated in Fig. 2, and holding the latter effectively against displacement without requiring the use of special rings. It may be suitably engraved or otherwise ornamented, as indicated by the reference numeral 17, although this is an incidental. A plain disk inlaid in the forward face of knob 10 by the procedure of the invention also lends a highly pleasing and artistically effective appearance to the knob. The disk will ordinarily be regular in its perimetrical outline, preferably circular, but it may also be oval, rectangular or of a specially shaped configuration.

In general accordance with the present invention a circular disk 16 is employed which is preferably, though not necessarily, convex in cross section. If other than circular, the disk is first appropriately positioned in the angular sense with reference to the body, as determined by the design 17 or as determined by the shape of the disk and recess. The disk is also at the same time axially aligned with the body 10, with its convex side facing the recess 15. In this relation of the parts, preferably effected in a suitable jig, end or axial pressure is exerted through the knob body stem 13 on the annular wall 14 surrounding said recess. Since the stem is located centrally of the forwardly concave front wall 12 of the body, the force thus applied at the rear thereof through stem 13 tends to flatten out and distend the wall and thereby cause the relatively narrow flange-like annular wall 14 to correspondingly flare or spread outwardly a slight amount about its periphery. The disk is of a diameter slightly greater than the internal diameter of the annular wall 14, in the original condition thereof illustrated in Fig. 3 of the drawings, but the outward spreading of wall 14 increases the inner diameter of the same enough to enable the disk to slip easily into the recess 15 into rear wall abutting engagement with the wall 12, as shown in Fig. 4.

Upon release of the axial thrust on the knob the wall 14 will return by its inherent elasticity or cold flow to its normal size and position, causing it to neatly overlap, embeddingly engage and securely grip the disk about its periphery.

In the actual commercial practice of the invention an assembling die of the character illustrated in Figs. 3, 4 and 5, generally designated by the reference numeral 18, is preferably employed. As schematically illustrated in the figures referred to, the die comprises a rigid base 19, an annular, floating, knob sustaining collar 20 supported on the base by a series of peripherally spaced coil springs 21, and a central, floating, disk sustaining plug 22 supported on the base by a spring or springs 23. The collar is provided with spaced bores 24 which receive the springs 21 and the plug 22 has similar provisions 25 for the spring support 23. The plug 22 is slidably guided with fairly close clearance in the internal cylindrical bore 26 of die collar 20.

The diameter of the bore 26 of the collar 20 in which plug 22 is guided approximates that of the ornamental inlay disk 16 to be applied to the knob 10, as illustrated in Fig. 3, and the internal diameter of the wall 14 of the plastic knob body 10 may inwardly overlap the die bore 26 to some extent.

The die collar 20 has a central and upper annular, radially undercut groove 28 immediately adjoining bore 26. The upper peripheral lip of this recess is greater in diameter than that of said bore and approximates the external diameter of the knob body 10, as illustrated in Fig. 3, thereby enabling rapid positioning of the knob in relation to the die collar 20 and to the coacting central die plug 22 on which the disk 16 rests.

Assuming that the ornamental disk 16 has been properly positioned in the die 18, resting on the die plug 22 with its margin immediately adjacent and centered by the collar bore 26, the plug body 10 is inverted and centered in the die collar recess 28, as illustrated in Fig. 3. Pressure is now applied directly to the rear knob extension 13 forcing the annular forward knob wall 14 against the bottom of collar groove 28 and depressing the collar 20 against the resistance of the springs 21 until it bottoms on base 19. Continuation of the downward force results in a spreading or distension of the annular wall 14 as described above, whereupon the die plug 22 is spring urged upwardly to insert the disk in the recess, in axial abutting engagement with the forward wall 12 of the plug body 10, as shown in Fig. 4.

When the disk is so positioned, axial thrust on the knob is released, allowing the collar 20 to rise upwardly relative to the internal die plug 22 and the latter to assume its original position, shown in Fig. 5. The release of radial outward spreading action on the wall 14 which accompanies release of axial thrust on the knob body enables the wall to return inwardly under its inherent elasticity. The disk 16 is not subject to contraction in the radial direction, consequently the disk is radially overlapped by or embedded in the material of the annular wall 14. The latter thus constitutes a gripping bead 29 which effectively retains the disk in place.

It is unnecessary to apply any sort of final heating or spinning operation to maintain the wall in this relation. Similarly, the need for preliminary operations to prepare the wall for outward spreading is eliminated. A single thrust and rearward release of the knob serves to spread the knob wall, to insert the disk 16 in desired place, to release the knob wall for its disk gripping or clamping action and to condition the knob for withdrawal from the die 18.

In Fig. 6 there is illustrated a modified type of knob made pursuant to the method of the invention. It features a solid molded plastic knob body 30 which is centrally bored at 31 in communication with the hollow tubular stem 32 and the forward recess 33 in which the disk 34 is disposed. The locking relationship of this disk to the forward, annular disk clamping wall 35 of the knob is the same as that described above, and is attained by the same sequence of operations. Various other modifications of the general knob structure may also be made without departing from the spirit of the invention.

The one-step application of an inlay disk or like ornamental element to a plastic member, by employing a disk of greater perimeter than a recess in the member and taking advantage of the inherent internal elasticity of the material of the plastic to initially accommodate and thereafter securely grip the element, as described above, is applicable to the production of a wide variety of ornamental and utilitarian objects without particular regard to the external shape of any of the component parts.

We claim:

1. A cold working method of manufacturing inlaid knobs and the like, comprising the steps of positioning a thin inlay disk in axial alignment with the forwardly opening, concave bottomed recess of a relatively rigid, synthetic plastic knob or like member, which recess is of marginal shape corresponding to, but of perimeter smaller than, that of said disk, applying an axial compressive force to said member in the zone thereof immediately surrounding said recess, while applying an opposite axial compressive force to a portion of said member located radially inwardly of the margin of the concave recess bottom, whereby to spread said surrounding portion uniformly outwardly sufficiently to admit the margin of said disk, inserting said disk a substantial distance in said recess, with said surrounding portion of the member projecting forwardly of the disk margin, and releasing said compression sufficiently to cause said surrounding portion to contract about said disk margin into inwardly overlapping, retaining engagement therewith.

2. A method of manufacturing inlay type knobs and the like by a cold working procedure, comprising the steps of providing an inlay disk of thin, relatively rigid material and of non-planar cross section and a recessed knob member of molded synthetic plastic material provided with a recess opening to an end face thereof, which recess has a concave bottom and has a marginal shape corresponding to the marginal shape of the disk but of smaller circumference, axially aligning said disk and recess in corresponding angular orientation relative to one another, applying a compressive force to the material of said knob which surrounds the recess thereof, while applying an opposite compressive force to the center of said bottom, whereby to cause the portion of said member immediately surrounding said recess to spread outwardly sufficiently to receive the margin of said disk, inserting said disk in said recess to a position rearwardly of the lip of said surrounding portion, while continuing the application of said compression, and releasing said compression sufficiently to cause the material of said surrounding portion to contract about the disk margin into inwardly overlapping, retaining engagement therewith.

3. A method of manufacturing inlay type knobs and the like by a cold working procedure, comprising the steps of providing an inlay disk of thin, relatively rigid material and of convex cross section and a recessed knob member of molded synthetic plastic material provided with a recess opening to an end face thereof, which recess has a concave bottom and has a marginal shape corresponding to the marginal shape of the disk but of smaller circumference, axially aligning said disk and recess in corresponding angular orientation relative to one another and with the convexity of said disk facing said recess, applying a compressive force to the material of said knob which surrounds the recess thereof, while applying an opposite compressive force to the center of said bottom, whereby to cause the portion of said member immediately surrounding said recess to spread outwardly sufficiently to receive the margin of said disk, inserting said disk in said recess to a position rearwardly of the lip of said surrounding portion, while continuing the application of said compression, and releasing said compression sufficiently to cause the material of said surrounding portion to contract about the disk margin into inwardly overlapping, retaining engagement therewith.

4. An improved knob or related member comprising a relatively rigid body of molded synthetic plastic material having an integral annular wall projecting axially forwardly of an end face thereof to define a forward disk receiving recess, said recess having an axially concave, forwardly facing bottom wall, and an ornamental disk of axially dished cross section disposed in said recess with the convex side thereof facing and axially sustained throughout its area by said concave recess wall and with the margin thereof held in embedded relation to said annular recess defining wall by contractile stress in the latter set up by physical cold flexure thereof.

5. The method of mounting an inlay in a knob or other member, which consists in providing a shallow forwardly opening recess in the member of the same shape as, but of slightly smaller size than, the inlay, subjecting the member to compressive forces in a direction axially of the recess by applying pressure in one direction against the member about the rim of the recess and by simultaneously applying pressure in the opposite direction against the member inwardly of and behind the recess, whereby to expand the recess laterally to a size which will receive the inlay, inserting the inlay in the expanded recess, and thereafter releasing said compressive forces, whereby to allow the rim of the recess to contract about the edge of the inserted inlay.

ERVIN J. HOBSON.
CARL J. LIND.

REFERENCES CITED

The following references are of record in the file of this patent:

UNITED STATES PATENTS

| Number | Name | Date |
| --- | --- | --- |
| 328,448 | Alden | Oct. 20, 1885 |
| 1,176,353 | Dover | Mar. 21, 1916 |
| 1,520,977 | Stevens | Dec. 30, 1924 |
| 2,000,276 | Delaval-Crow | May 7, 1935 |
| 2,263,166 | Darvie et al. | Nov. 18, 1941 |
| 2,316,306 | Wyman | Apr. 13, 1943 |
| 2,485,166 | Repas | Oct. 18, 1949 |